Figure 4:
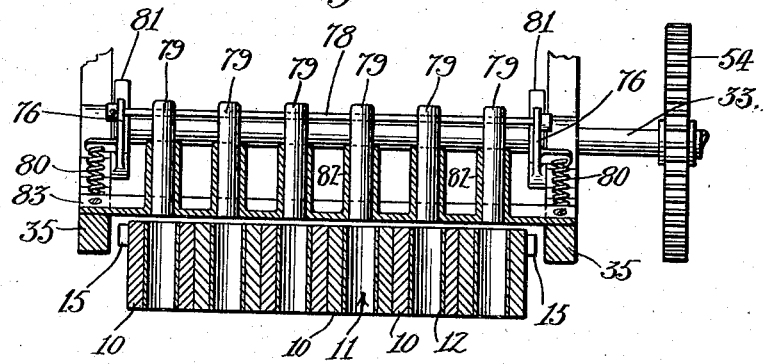

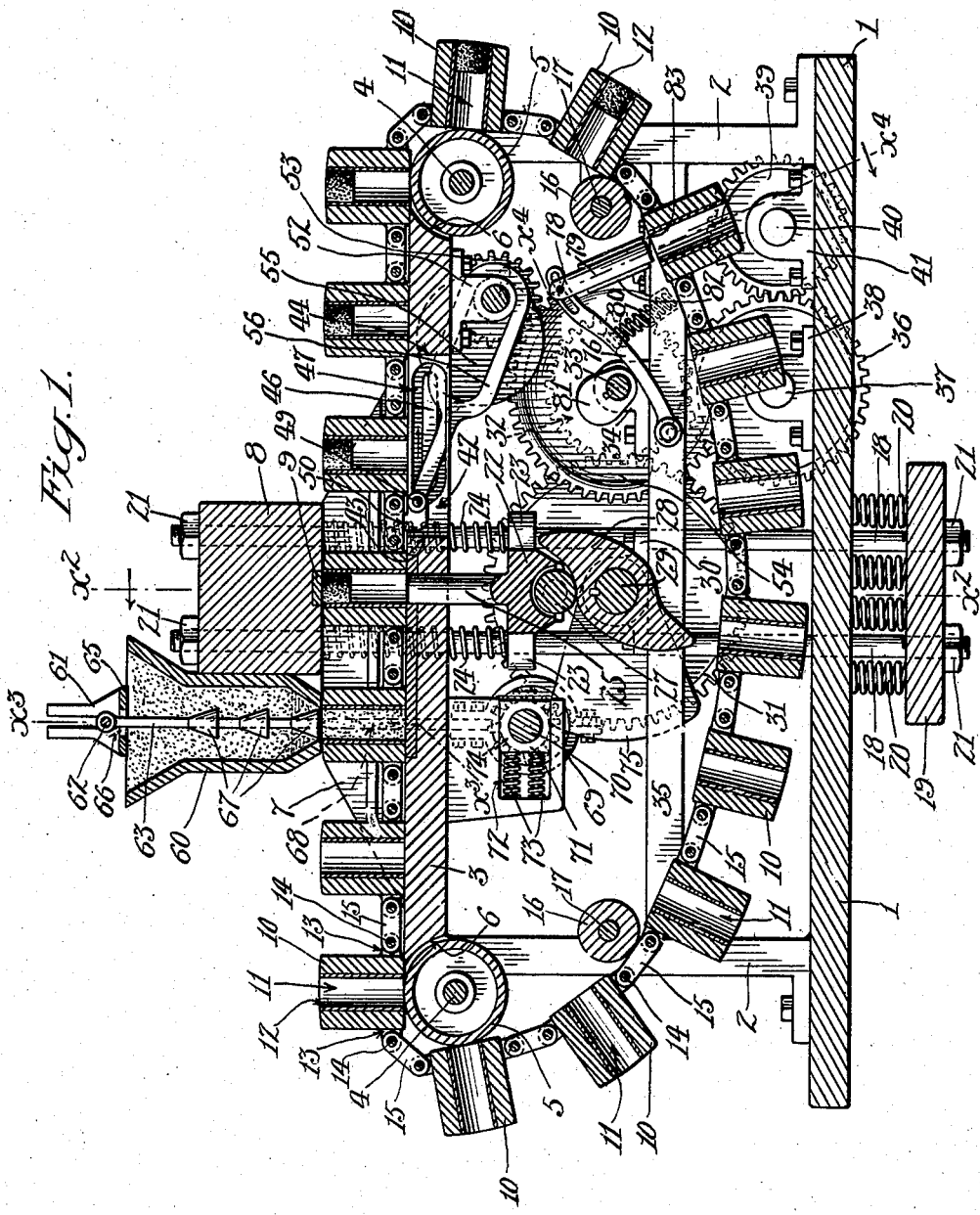

No. 867,210.
PATENTED SEPT. 24, 1907.
C. W. REYNOLDS.
BRIQUET MACHINE.
APPLICATION FILED OCT. 29, 1906.
3 SHEETS—SHEET 2.
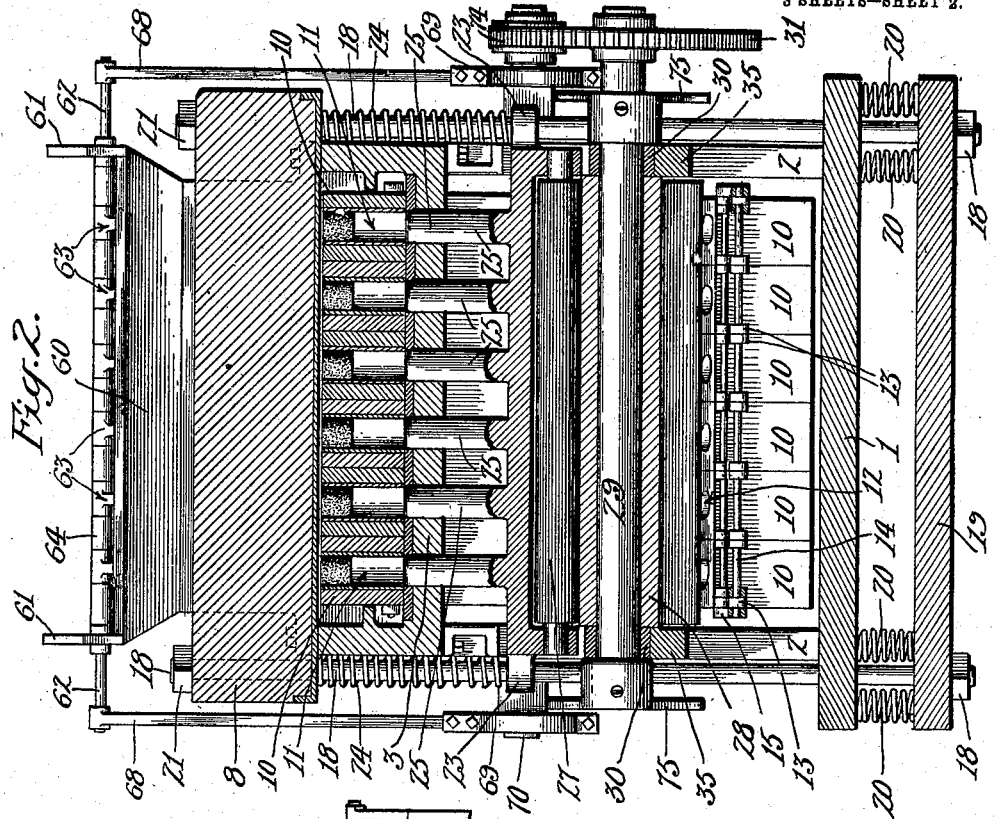
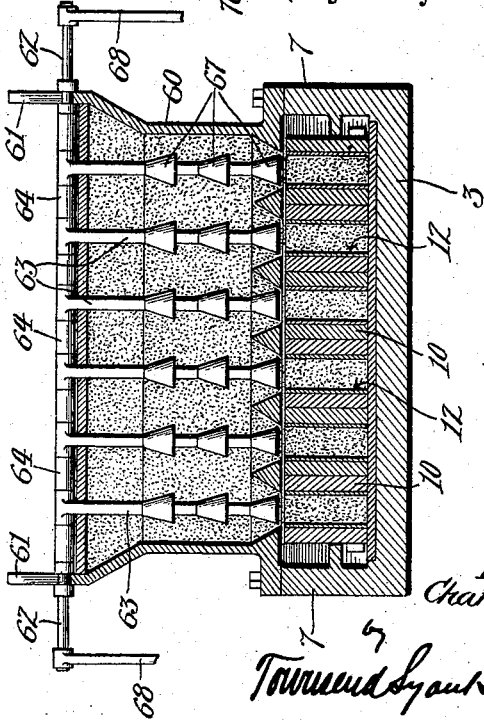
Witnesses:—
Frank A. Graham
Isabel Hall
Inventor,
Charles W. Reynolds
by
Townsend Syout Hackley & Knight
His Attys
THE NORRIS PETERS CO., WASHINGTON, D. C.

No. 867,210.

PATENTED SEPT. 24, 1907.

C. W. REYNOLDS.
BRIQUET MACHINE.
APPLICATION FILED OCT. 29, 1906.

3 SHEETS—SHEET 3.

Witnesses:—
Frank La Graham
Isabel Hall

Inventor,
Charles W. Reynolds.
by
Townsend Hackley & Knight
His Attys.

UNITED STATES PATENT OFFICE.

CHARLES W. REYNOLDS, OF LOS ANGELES, CALIFORNIA.

BRIQUET-MACHINE.

No. 867,210.         Specification of Letters Patent.         Patented Sept. 24, 1907.

Application filed October 29, 1906. Serial No. 341,193.

*To all whom it may concern:*

Be it known that I, CHARLES W. REYNOLDS, a citizen of the United States, residing at Los Angeles, in the county of Los Angeles, State of California, have invented a new and useful Briquet-Machine, of which the following is a specification.

This invention relates to briquet machinery and the main object of the invention is to secure a great molding pressure and to adjust such pressure to the desired degree.

Another object is to provide a simple and effective filling mechanism which will prevent the material from clogging in the filling hopper.

Another object is to introduce the material into one end of the mold block and introduce the compressing plunger into the opposite end of the mold block, thus enabling the filling mechanism to be located at an elevation above the orbit of the mold blocks and permitting the compressing mechanism to be located in the main portion of the machine and form a compact mechanism of great strength.

The invention embraces a plurality of connected mold blocks forming an endless chain which moves the mold blocks in an orbit, and a further object is to provide a novel and effective means for producing an intermittent or step by step movement of said chain of mold blocks, whereby each step is accurately timed and its limits are sharply defined, thus insuring that the mold blocks will be preferably in alinement with the filling mechanism, with the compressing mechanism and with the expelling mechanism during the periods between each step when the mold blocks are at rest.

Another object is to provide a novel and efficient positively operated expelling mechanism for delivering the briquets from the mold blocks.

The filling mechanism is driven by the main gearing and a further object is to provide a novel and effective means for disconnecting the filling mechanism from the main gearing during the time that the chain of mold blocks is advancing each step, thus relieving the machine of the unnecessary duty of operating any of the elements of the filling mechanism when the filling mechanism is not operating to fill the mold blocks; a further object being to positively shut off the delivery of material from the hopper during the travel of the mold blocks from the filling point to the compressing point. Another object is to provide a novel and effective form of filling plunger.

Further objects and advantages will be brought out in the following description:—

Figure 5:
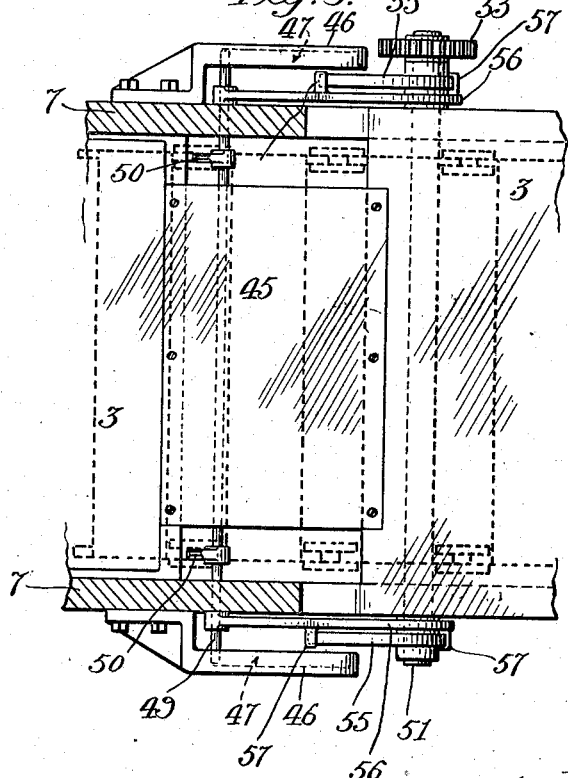

Referring to the drawings:—Figure 1 is a longitudinal vertical section through one form of machine. Fig. 2 is a vertical cross section on line $x^2$—$x^2$ Fig. 1. Fig. 3 is a vertical sectional view through the hopper and adjacent filling mechanism on line $x^3$—$x^3$ Fig. 1. Fig. 4 is a sectional view on line $x^4$—$x^4$ Fig. 1, looking in the direction of the arrow and showing only the mechanism immediately related to the expelling device and omitting the other mechanism of the press which is in the background. Fig. 5 is a plan view, showing a portion of the frame and the mold block actuating mechanism with three gangs of mold blocks indicated by dotted lines.

1 designates the bed plate having standards 2 which support a top plate 3. At the respective ends of the top plate 3, shafts 4 are journaled which carry idle rollers 5 which serve to support the endless chain of mold blocks about to be described. Each end of the top plate 3 is formed with a concave recess 6, which enables the upper face of each idle roller 5 to lie substantially flush with, or in the same plane with the upper face of the top plate 3. Vertical wings or plates 7 extend up from each side of the top plate 3 and support a bulkhead 8. Extending longitudinally of the bulk-head 8 is a pressure plate 9, the bulk-head being recessed to receive the pressure plate, and the lower face of the pressure plate being substantially flush with the lower face of the bulk-head.

10 designates a mold block in which the briquet is formed. Each mold block 10 comprises a cylindrical member, having a central bore 11 with a steel lining 12. Projecting from the inner end of each mold block are four lugs 13. The mold blocks are arranged in gangs, in the present embodiment there being six mold blocks in each gang, and the respective mold blocks of a gang have pintles 14 which pass through their respective alining lugs 13. The respective gangs of mold blocks are connected by links 15, which are connected to the pintles 14 at each outer adjacent pair of lugs, thereby forming an endless chain of mold blocks. The top run of the chain of mold blocks rests upon the top plate 3 and is supported and guided thereby, and the chain of mold blocks at each end of the top plate 3 passes over the idle rollers 5, and the lower run of the chain of mold blocks is guided by other idle rollers 16 mounted on shafts 17 which are supported by standards 2.

Arranged on each side of the machine is a pair of bolts 18 which extend through the bulk-head 8, through the bed plate 1, and through a resistance plate 19. Several coil springs 20 are arranged around each bolt 18 between the bed plate 1 and the resistance plate 19, there being nuts 21 on each end of the bolts 18 for adjusting the resistance plate 19 relatively to the bolts 18 to regulate the pressure of the springs 20.

A cross-head 22 is arranged below the top plate 3 and has lugs or guides 23 which are slidably mounted on the bolts 18, there being compression springs 24 arranged on the respective bolts 18 between the lugs 23 and the under face of the bulk-head 8, as clearly shown in Fig. 2. The cross-head 22 carries a gang of compression plungers 25, and the top plate 3 is provided with circular openings to receive the plungers 25 and guide the same to the mold blocks. The plungers 25 are spaced apart so that each one will aline perfectly with its related mold block. The cross-head 22 is provided underneath with a long idle anti-friction roller 27. A double cam 28 is arranged below the cross-head 22 and is adapted to reciprocate the same by acting against the anti-friction roller 27. The double cam 26 is rigidly mounted on a cam shaft 29 which is suitably journaled in bearings 30. One end of the cam shaft 29 carries a gear 31, which is driven by a gear 32 mounted on a shaft 33, the shaft 33 being journaled in brackets 34 which are mounted on horizontal cross-bars 35 supported by standards 2. The gear 32 is driven by a gear 36 which is mounted on a shaft 37 journaled in bearings 38 which are supported on the bed plate 1. The gear 36 is driven by a pinion 39 mounted on a driving shaft 40 which is journaled in bearings 41 on the bed plate 1. The driving shaft 40 is provided with a driving pulley and a heavy fly-wheel, not shown.

The endless chain of mold blocks is driven step by step by the following mechanism: The top plate 3 has an opening 42 which extends from edge 43 to edge 44, as clearly shown in Fig. 1, and a plate 45 is sunk flush with the upper face of the top plate 3 and serves to bridge the gap 42 and as a support for the chain of mold blocks in passing over the gap. Movement plates 46 are attached to each side of the top plate 3 and each movement plate has an ovoidal groove 47, (see Fig. 1) each groove having an abrupt angle at its upper end nearest the bulk-head 8. A cross-head comprising a bar 49 extends across the gap 42 and each end of the bar 49 rides in the groove of its movement plate. Mounted on the cross-bar 49 near each end thereof but inside of the side bars 46 is a dog 50, one dog being adapted to enter the space between two adjacent lugs 13 of the mold blocks at one side of the machine and the other dog 50 being adapted to enter a similar space between lugs 13 on the other side of the machine, as clearly shown in Figs. 5 and 1. A shaft 51 is mounted in journals 52 which hang from the under side of top plate 3, the shaft 51 being driven by a pinion 53 which meshes with a gear 54, the latter being mounted on shaft 33 before described. Mounted on each end of the shaft 51 are eccentrics 55 (see Figs. 5 and 1). Connected to the respective outer ends of the cross-bar 49 are operating links 56, the link portions of which are guided on shaft 51, and each link has a pair of studs 57 at opposite ends of the link which are adapted to bear against the eccentrics 55 at diametrically opposite points on the latter, so that as the eccentrics 55 are operated by the shaft 51 the eccentrics 55 will operate between the studs 57 to impart a forward and back motion to the respective operating links, their backward motion being imparted by a thrust of the eccentrics 55 against the outer studs 57, and their inward movement being imparted by a thrust of the eccentrics 55 against the inner studs 57. As the operating links are thus driven forward and back their inner ends carry the cross-bar 49 through an orbit defined by the movement plates 47, and the result is that during the forward movement of the operating links the cross-bar 49 is drawn forward through the upper horizontal portion of the grooves 47, and as the dogs 50 are in engagement with the chain of mold blocks between the lugs 13, the chain of mold blocks is drawn along with the dogs 50; near the forward end of the stroke of the operating links, as the forward curve of the grooves 47 causes the cross-bar 49 to travel down, the dogs 50 are drawn down out of their engagement with the lugs 13 and the forward movement of the chain of mold blocks is stopped. During the backward movement of the operating links the dogs 50 are moved back on a lower plane, and as they ascend by the raising of the cross bar 49 in the rear ends of the grooves 47, the dogs 50 enter between the succeeding set of lugs 13, and as the dogs 50 are again drawn forward through the upper part of their orbit they advance the chain of mold blocks another step. Thus as the machine operates the chain of mold blocks is advanced step by step by the dogs 50, the chain of mold blocks lying stationary during the time that the dogs 50 are traveling back through the lower plane of their orbit, and this stationary position of the chain of mold blocks enables the mold blocks to be filled with material, the briquets compressed, and briquets expelled.

The filling of the mold blocks is accomplished by the following mechanism, consisting of a hopper 60 which is mounted on the vertical plates 7. The hopper 60 extends across the machine and its upper portion is flaring as shown clearly in Figs. 1 and 2. The lower walls of the hopper slant toward the center and the lower wall is formed with a series of discharge mouths which register with the respective mold blocks of a gang when a gang of mold blocks is under the hopper. Slotted guides 61 are arranged at each end of the hopper and receive and guide a cross-bar 62 which carries a gang of filling plungers 63, the latter being pivoted on the cross-bar 62 and spaced apart by collars 64. A guide plate 65 extends across the hopper and is provided with slots 66, through which the stems of the filling plungers project, the slots 66 allowing the filling plungers to swing slightly to accommodate themselves to the inclined walls 60, but prevent the filling plungers 63 from swinging sidewise of the machine. Each filling plunger 63 is formed with a plurality of conical enlargements 67, and as the cross-bar 62 is reciprocated in a vertical plane the filling plungers are moved up and down in the hopper and the conical enlargements push the material down to the lower part of the hopper and into the gang of mold blocks beneath, the filling plungers making several reciprocations while the mold blocks remain under the hopper. This construction which enables the filling plungers to swing somewhat results in preventing the material from clogging in the hopper and it also acts to mix the material somewhat.

The cross-bar 62 is operated in a vertical plane by means of eccentric rods 68 which are operated by eccentric 69 mounted on a shaft 70, the shaft 70 being mounted at each end in boxes 71 which are slidably mounted in ways 72, there being springs 73 for normally holding the boxes in one end of the ways 72. The shaft 70 carries a pinion 74 which is adapted to mesh with the gear 31 when the boxes 71 are in the position shown in Fig. 1, but the boxes 71 are at intervals moved along the ways 72 to throw the pinion 74 out of mesh with the gear 31, by means of a pair of cams 75 which are mounted on the cam shaft 29 at each end thereof, as shown in Fig. 2, the cams 75 acting against the shaft 70 to shift the same and throw the pinion 74 out of mesh with the gear 31 during the time that the chain of mold blocks is advancing one step, the springs 73 restoring the shaft 70 to normal position and moving the pinion 74 into mesh with gear 31 as soon as the cams 75 move out of contact with the shaft 70.

The briquets are expelled by the following mechanism: A pair of rock arms 76 are pivoted on cross bars 35; the rock arms 76 are connected by a rod 78 which is extended through a gang of six expelling plungers 79, the rock arms 76 having slotted ends which receive the rod 78, as shown in Figs. 1 and 4. Compression springs 80 are arranged behind the respective rock arms 76 for normally holding them retracted together with expelling plungers 79. Mounted on shaft 33 is a pair of cams 81 which respectively operate against the respective rock arms 76. The expelling plungers 79 are mounted to reciprocate in tubular guides 82, which are supported on a cross-bar 83, as shown in Fig. 4. The cams 81 are so timed that they depress the rock arms 76 when the chain of mold blocks is stationary, thus thrusting the expelling plungers 79 into the adjacent mold blocks containing the briquets to be ejected. The briquets upon being expelled from the mold blocks may be conveyed from the machine in any desired manner.

While the operation of the several elements of the machine have been described the operation of the machine in general will be briefly set forth:

The material from which the briquets are formed is placed in the hopper 60, and with a gang of mold blocks under the hopper the filling plungers 67 are reciprocated vertically several times, thus driving material from the hopper into the respective mold blocks, so that the bores of the mold blocks will be filled from top to bottom as shown, the lowest position of the filling plunger being at the bottom of the hopper, as shown in Fig. 1. At the conclusion of the strokes of the filling plungers the chain of mold blocks is ready to be advanced and as the dogs 50 have by this time entered their engagement between lugs 13, the dogs 50 as they move forward draw the chain of mold blocks one step forward, the chain of mold blocks terminating its movement at the moment the dogs 50 disengage from their seat between the lugs 13, and by this time the gang of mold blocks which have been filled with the material are under the pressure plate 9 and in perfect register with the compressing plungers 25. One of the cams now acts against the anti-friction roller 27 to lift the cross-head 22 which thrusts all of the compressing plungers 25 simultaneously into the respective superposed mold blocks, and as the plungers are thus thrust in they drive against the material and compress the same into compact form, thus making a series of briquets. Any desired degree of compression may be secured by adjusting nuts 21. For example, by screwing up the nuts 21 the tension of springs 20 is increased, and by slacking the nuts 21 the pressure of springs 20 is decreased. During the compressing of the briquets against the pressure plate 9, the pressure is taken by the bulk-head 8 and the bulk-head 8 is held from yielding by bolts 18 which in turn are held against yielding by the resistance plate 19, and the resistance of the latter is determined by the springs 20. After the briquets have thus been compressed the springs 24 move down the cross-head 22 and draw down the compressing plungers 25, as the cam 28 rolls forward and allows the anti-friction roller 27 to recede.

While the briquets are being compressed the cams 81 are acting against rock arms 76 and depressing expelling plungers 79 and pushing the briquets out of the mold blocks which are in line with the expelling plungers, the expelling plungers being withdrawn and moved back again to normal position by the time the chain of mold blocks is to be advanced the next step. It should be understood that just prior to the forward movement of the chain of mold blocks the cams 75 act to throw the pinion 74 out of mesh with gear 31 and that it is held out of mesh with said gear by cams 75 until the chain of mold blocks has again come to rest.

What I claim is:—

1. In a briquet machine, a series of mold blocks movable in an orbit, and means for advancing said mold blocks step by step comprising a dog, means for moving said dog into engagement with the chain of mold blocks and for moving said dog forward a definite distance while in such engagement, and for moving said dog out of engagement at the termination of said distance.

2. A series of mold blocks forming an endless chain movable through an orbit, a dog adapted to engage said chain, and means for operating said dog in two definite planes, said dog being in engagement with the chain while in one plane and being out of engagement with said chain when in the other plane.

3. In a briquet machine, a series of mold blocks forming a chain, a dog adapted to engage said chain, means forming a continuous way with two runs, means guided by said way for carrying said dog, and means for moving said dog in an orbit defined by the path of said way, whereby the dog is automatically engaged with the chain to drive the latter a certain distance and disengage from said chain after having moved the chain the said distance.

4. In a briquet machine, a series of mold blocks forming a chain movable in an orbit, a dog adapted to coact with said chain to advance the chain step by step, means for guiding said dog through a stroke in one plane when engaged by said chain and in another plane when disengaged from said chain, an operating link connected to said dog, a shaft passing through said link and guiding the link, an eccentric on said shaft, and projections on said link bearing against opposite parts of said eccentric, whereby the rotation of the eccentric imparts a to and fro movement to said link for operating said dog.

5. In a briquet machine, a series of mold blocks forming a chain movable through an orbit, a pair of dogs adapted to engage said chain to move the chain step by step, a rod connecting said dogs, means forming ovoidal ways for guiding the respective ends of said rod, and means for operating said rod through said ways to move said dogs in one plane while in engagement with said chain and in another plane when disengaged from the chain.

6. A plurality of mold blocks connected to form an endless chain, a pair of dogs adapted to engage said chain, a rod connecting said dogs, means provided with ovoidal ways for guiding said rod in two planes, a pair of operating links connected to the respective ends of said rod, a shaft passing through said links and guiding the links, eccentrics on said shaft and pins on said links for bearing against opposite points of said eccentrics, whereby as the eccentrics rotate a to and fro movement is imparted to the operating links, and the dogs are moved through their ways.

7. In a briquet press, a series of mold blocks forming a connected chain, means for filling said mold blocks, a cross-head, a gang of plungers mounted on the cross-head for compressing the material in said mold boxes, a bulkhead for resisting the pressure of material being compressed by the plungers, bolts passing through the bulk head, a resistance plate connected to said bolts, and springs interposed between said resistance plate and a stationary abutment.

8. A series of mold blocks connected to form an endless chain, a hopper having a discharge orifice with which the mold blocks are adapted to be brought into register step by step, and a plunger having a thrust stroke mounted in said hopper, the plunger having a series of shoulders for pushing the briquet material toward the discharge orifice of the hopper.

9. A series of mold blocks arranged in gangs connected to form a chain, a hopper provided with a series of discharge mouths with which each gang of mold blocks is adapted to be brought into register step by step, a cross bar extending across the receiving mouth of said hopper, a series of filling plungers connected to said cross-bar, means for guiding said cross-bar in a vertical plane, and means for operating said cross-bar to impart a thrusting stroke to said plungers.

10. A series of mold blocks arranged in gangs connected to form a chain, a hopper provided with a series of discharge mouths with which each gang of mold blocks is adapted to be brought into register step by step, a cross bar extending across said hopper, a series of filling plungers connected to said cross-bars, means for guiding said cross-bar in a vertical plane, and means for operating said cross-bar to impart a thrusting stroke to said plungers, each plunger comprising a stem pivoted to said cross-bar and having a series of conical enlargements formed on the stem.

11. In a briquet machine, a series of mold blocks movable through an orbit, filling mechanism, compressing mechanism, a gear operating with the compressing mechanism, a pinion driven by said gear for operating the filling mechanism, means for moving said mold blocks step by step, and means for throwing said pinion out of mesh with said gearing to permit the mold blocks to be advanced without operating any of the filling mechanism.

12. In a briquet machine, a series of mold blocks movable through an orbit, a hopper, a plunger operating in said hopper for forcing material into the mold blocks, an eccentric for operating said plunger, a shaft for operating said eccentric, slidable blocks in which said shaft is journaled, a compression mechanism, a gear operating with the compressing mechanism, a pinion on said shaft, yielding means for holding said slidable blocks in one position with said pinion in mesh with said gear, and means for shifting said blocks to move said shaft laterally and throw said pinion out of mesh with said gear to permit the mold blocks to be advanced.

13. In a briquet machine, a series of mold blocks movable through an orbit, a hopper, a plunger operating in said hopper for forcing material into the mold blocks, an eccentric for operating said plunger, a shaft for operating said eccentric, slidable blocks in which said shaft is journaled, a compressing mechanism, a gear operating with the compressing mechanism, a pinion on said shaft, yielding means for holding said slidable blocks in one position with said pinion in mesh with said gear, a cam shaft, a cam thereon for operating the compressing mechanism, and a cam on the cam shaft for operating against the first shaft to move said shaft laterally and throw the pinion out of mesh with the gear.

14. In a briquet machine, a series of mold blocks movable through an orbit, a pivoted rock arm, an expelling plunger external of the mold blocks and connected to said rock arm, and a cam for swinging said rock arm to thrust said expelling plunger into a mold block and expel briquets therefrom.

15. In combination with a gang of mold blocks, a pair of pivoted rock arms, a gang of expelling plungers, a rod connecting said plungers, the ends of said rock arms having slots which receive the ends of said rod, a pair of cams for acting against said rock arms to thrust said plungers into the gang of mold blocks, and means for retracting said rock arms to lift the expelling plungers out of the mold blocks.

In testimony whereof, I have hereunto set my hand at Los Angeles California this 20th day of October 1906.

CHARLES W. REYNOLDS.

In presence of—
GEORGE T. HACKLEY,
F. M. TOWNSEND.